(12) United States Patent
Miura et al.

(10) Patent No.: US 7,041,377 B2
(45) Date of Patent: May 9, 2006

(54) RESIN COMPOSITION FOR VIBRATION-DAMPING MATERIAL, VIBRATION-DAMPING MATERIAL, AND SOUND-INSULATING MEMBER

(75) Inventors: Akihisa Miura, Kyoto (JP); Hiroyuki Abe, Kyoto (JP); Katsuhiko Yamaji, Hasuda (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/257,147

(22) PCT Filed: Apr. 12, 2001

(86) PCT No.: PCT/JP01/03176

§ 371 (c)(1),
(2), (4) Date: Oct. 9, 2002

(87) PCT Pub. No.: WO01/79376

PCT Pub. Date: Oct. 25, 2001

(65) Prior Publication Data

US 2003/0109621 A1    Jun. 12, 2003

(30) Foreign Application Priority Data

| Apr. 14, 2000 | (JP) | 2000-113887 |
| Oct. 3, 2000 | (JP) | 2000-303715 |
| Feb. 9, 2001 | (JP) | 2001-034065 |
| Feb. 9, 2001 | (JP) | 2001-034066 |

(51) Int. Cl.
| B32B 7/02 | (2006.01) |
| B32B 13/02 | (2006.01) |
| B32B 13/12 | (2006.01) |
| B32B 15/08 | (2006.01) |
| B32B 17/10 | (2006.01) |

(52) U.S. Cl. ............... 428/442; 428/463; 428/522; 524/272; 524/273; 524/466; 524/472; 524/473

(58) Field of Classification Search ........... 524/272, 524/273, 466, 472, 473; 428/442, 463, 522
See application file for complete search history.

(56) References Cited

U.S. PATENT DOCUMENTS

| 2,120,222 | A | * | 6/1938 | Spencer et al. | 524/16 |
| RE21,572 | E | * | 9/1940 | Ott | 524/258 |
| 2,307,057 | A | * | 1/1943 | Mitchell | 428/485 |
| 3,005,791 | A | * | 10/1961 | Church | 524/272 |
| 3,169,935 | A | * | 2/1965 | Sherliker et al. | 524/472 |
| 3,445,416 | A | * | 5/1969 | Condo | 524/297 |
| 3,816,347 | A | * | 6/1974 | Luh | 252/511 |
| 4,006,114 | A | * | 2/1977 | Carlson | 524/411 |
| 4,098,748 | A | * | 7/1978 | Moore et al. | 523/200 |
| 4,129,540 | A | * | 12/1978 | Kroenke | 524/100 |
| 5,130,364 | A | * | 7/1992 | Chen | 524/472 |
| 5,182,322 | A | * | 1/1993 | Dawes | 524/308 |

FOREIGN PATENT DOCUMENTS

| EP | 0 785 231 A1 | | 7/1997 |
| JP | 53101026 A | * | 9/1978 |
| JP | 56147839 A | * | 11/1981 |
| JP | 62285940 A | * | 12/1987 |
| JP | 02182422 A | * | 7/1990 |
| JP | 2002105321 A | * | 4/2002 |

OTHER PUBLICATIONS

JPO machine translation of JP 11080562 A (Mar. 26, 1999) Nomura et al.*
Derwent abstract for JP 53101026 A (Sep. 4, 1978).*
Derwent abstract for JP 62285940 A (Dec. 11, 1987).*
JPO abstract for JP56-147839-A (Nov. 17, 1981).*
USPTO obtained translation of JP02-182422-A (Jul. 17, 1990).*
USPTO obtained English language translation for JP53-101026-A (Sep. 4, 1978), Tanigawa et al.*
USPTO obtained English language translation for JP56-147839-A (Nov. 17, 1981), Kai et al.*
USPTO obtained English language translation for JP62-285940-A (Dec. 11, 1987), Kanno, Isumo.*
JPO machine translation of JP2002-105321-A.*
"Chlorinated Paraffins" "Environmental Health Criteria 181" (Published under joint sponsorship of United Nations Environment Programme, International Labour Organisation, and World Health Organization, Geneva, Switzerland, 1996), ISBN 92 4 157181 0, ISSN 0250-863X, downloaded from http://www.inchem.org/documents/ehc/ehc/ehc181.htm, Nov. 3, 2005.*

* cited by examiner

Primary Examiner—Matthew A. Thexton
(74) Attorney, Agent, or Firm—Rader, Fishman & Grauer

(57) ABSTRACT

The object of the invention is to provide sound insulating members exhibiting both high vibration damping performance and high sound insulation performance, a vibration damping material for affording such members and a resin composition for forming the vibration damping material. The invention provides a first resin composition for vibration damping materials which contains 100 parts by weight of a chlorine-containing thermoplastic resin, and 20 to 200 parts by weight of a chlorinated paraffin having 12 to 16 carbon atoms on average. The thermoplastic resin contains preferably 20 to 70 wt. %, more preferably 30 to 70 wt. %, of chlorine. The chlorinated paraffin is preferably 30 to 70 wt. %, more preferably 35 to 65 wt. %, in chlorination degree.

12 Claims, No Drawings

RESIN COMPOSITION FOR VIBRATION-DAMPING MATERIAL, VIBRATION-DAMPING MATERIAL, AND SOUND-INSULATING MEMBER

FIELD OF THE INVENTION

The present invention relates to compositions for vibration damping members and vibration damping materials prepared from the composition by forming. The invention relates also to sound insulating members comprising the vibration damping material for reducing the vibration and noise produced in various structures such as office buildings, houses, condominiums and like residential buildings, expressways, elevated bridges and railroads, transport means such as motor vehicles, rolling stock, ships and aircraft (including helicopters), household electric appliances, office automation devices, industrial machines, mobile products, etc.

BACKGROUND ART

Available as vibration damping materials for absorbing vibration are those of the nonconstraining type which are merely attached each as a superposed layer to vibration sources, and those of the constraining type which comprise a layer to be attached over one surface thereof to the vibration source and a constraining layer resistant to deformation and superposed on the other surface of the layer.

The main factor enabling the nonconstraining vibration damping material to exhibit vibration damping properties is the storage modulus (E') relating to the elastic properties of the material, so the nonconstraining vibration damping material consists mainly of a resin component and a metal powder or inorganic material. However, the nonconstraining vibration damping material needs to have such flexibility as to readily permits the material to be laminated to the vibration source. For this reason, there is a limitation to the vibration damping properties.

On the other hand, the main factor enabling the constraining vibration damping material to exhibit vibration damping properties is tan δ (=E"/E') (wherein E" is the loss modulus relating to the viscous properties of the material). The constraining vibration damping material consists mainly of a rubber or a mixture of resin and rubber. However, the upper limit of tan δ is about 1.0 to about 1.2 and is not a level affording satisfactory vibration damping properties. Still higher vibration damping properties are desired for constraining vibration damping materials to exhibit higher sound insulation performance.

Proposed as a resin composition for vibration damping materials is a composition for high attenuation materials which comprises a base polymer material having a polar side chain such as chlorinated polyethylene, and chlorinated paraffin having 20 to 50 carbon atoms on average with admixed with the polymer material (JP-A 11-80562). The vibration damping material obtained is nevertheless limited to about 1.3 to about 1.5 in tan δ and fails to exhibit outstanding vibration damping performance.

On the other hand, generally used as sound insulating materials are metalic materials or inorganic materials having a larger specific gravity, such as lead sheets (11.3 in specific gravity), asphalt having iron particles incorporated therein, concrete, gypsum boards, etc. However, these sound insulating materials fail to exhibit high vibration damping performance and are not satisfactory in both vibration damping performance and sound insulation performance.

The object of the present invention is to provide sound insulating members exhibiting high vibration damping performance and high sound insulation performance, a vibration damping material for affording such members and a resin composition for forming the vibration damping material.

DISCLOSURE OF THE INVENTION

The first resin composition for vibration damping materials of the present invention contains 100 parts by weight of a chlorine-containing thermoplastic resin, and 20 to 200 parts by weight of a chlorinated paraffin having 12 to 16 carbon atoms on average. The chlorine-containing thermoplastic resin contains preferably 20 to 70 wt. %, more preferably 30 to 70 wt. %, of chlorine. The chlorinated paraffin is preferably 30 to 70 wt. %, more preferably 35 to 65 wt. %, in chlorination degree.

The second resin composition for vibration damping materials of the present invention contains 100 parts by weight of a chlorine-containing thermoplastic resin having a chlorine content of 20 to 70 wt. %, preferably 20 to 65 wt. %, and 50 to 300 parts by weight of a mixture of a chlorinated paraffin having 12 to 16 carbon atoms on average with 30 to 70 wt. %, preferably 30 to 65 wt. %, in chlorination degree and a chlorinated paraffin having 20 to 50 carbon atoms on average with 30 to 70 wt. %, preferably 30 to 65 wt. %, in chlorination degree, the proportion of the former chlorinated paraffin being larger than the proportion of the latter chlorinated paraffin.

The third resin composition for vibration damping materials of the present invention contains 100 parts by weight of a chlorine-containing thermoplastic resin having a chlorine content of 30 to 50 wt. %, and 50 to 300 parts by weight of a mixture of a chlorinated paraffin having 20 to 50 carbon atoms on average with 30 to 50 wt. % in chlorination degree and a chlorinated paraffin having 20 to 50 carbon atoms on average with 50 to 70 wt. % in chlorination degree.

The first to third resin compositions described for affording vibration damping materials may further contain 50 to 200 parts by weight of a plasticizer per 100 parts by weight of the chlorine-containing thermoplastic resin.

The first to third resin compositions described for affording vibration damping materials may further contain 1 to 20 parts by weight of a rosin compound per 100 parts by weight of the chlorine-containing thermoplastic resin.

The fourth resin composition for vibration damping materials of the present invention contains 100 parts by weight of a chlorine-containing thermoplastic resin having a chlorine content of 20 to 70 wt. %, 50 to 300 parts by weight of a chlorinated paraffin having 12 to 50 carbon atoms on average with 30 to 70 wt. % in chlorination degree and 1 to 20 parts by weight of a rosin compound.

The resin compositions of the present invention for affording vibration damping materials are formed into sheets, films, plates, bars, blocks or the like, whereby vibration damping materials are obtained. Such vibration damping materials are used to provide sound insulating members.

Chlorine-containing thermoplastic resins are suitable for use in the present invention insofar as they contain 20 to 70 wt. % of chlorine. Examples of useful chlorine-containing thermoplastic resins are vinyl chloride resins, vinylidene chloride resins, vinyl chloride-vinylidene chloride copolymers, blends of vinyl chloride resin and vinylidene chloride resin, chlorinated polyethylene resins, chlorinated vinyl chloride resins, vinyl chloride-vinyl acetate copolymers, etc.

When the chlorine-containing thermoplastic resin contains less than 20 wt. % of chlorine, impaired vibration damping properties will result, whereas if the chlorine content is in excess of 70 wt. %, the resin becomes rigid and difficult to form.

The chlorine-containing thermoplastic resin may contain a substituent other than chlorine, such as cyano, hydroxyl, acetyl, methyl, ethyl, bromine or fluorine in an amount of up to 5 wt. %. If such substituents other than chlorine are present in a proportion of over 5 wt. %, the composition is likely to exhibit lower vibration damping performance. The chlorine-containing thermoplastic resin is preferably amorphous, low in storage modulus and accordingly great in the value of loss tangent.

The first chlorine-containing thermoplastic resin contains preferably 30 to 70 wt. % of chlorine, the chlorine content of the third chlorine-containing thermoplastic resin is 30 to 50 wt. %, and that of the third chlorine-containing thermoplastic resin is 50 to 70 wt. %. The second and fourth chlorine-containing thermoplastic resins contain 20 to 70 wt. % of chlorine. If the resin composition for vibration damping materials has too low a chlorine content, the resulting damping material will be lower in vibration damping properties, whereas if the chlorine content is excessively high, the resin is rigid and difficult to form.

The chlorinated paraffins for use in the present invention will be described next.

While the chlorinated paraffins may have a branched molecular chain structure, desirable are linear chain chlorinated paraffins. The average number of carbon atoms of the chlorinated paraffins is a numerically averaged.

The chlorinated paraffin of the first resin composition for vibration damping materials is preferably 30 to 70 wt. % in chlorination degree. The chlorinated paraffins of the second to fourth resin compositions for vibration damping materials are 30 to 70 wt. % in chlorination degree. Too low a degree of chlorination leads to unsatisfactory vibration damping properties, while too high a chlorination degree gives low compatibility to the chlorinated paraffin, possibly leading to bleed out. The closer the chlorination degree of the chlorinated paraffin to the chlorine content of the chlorine-containing thermoplastic resin, the higher the compatibility of the paraffin is and the higher the resulting vibration damping performance is.

The chlorinated paraffin of the first resin composition for vibration damping materials has 12 to 16 carbon atoms on average. If the average number of carbon atoms is too small, the chlorinated paraffin will bleed out, whereas if the number is too great, satisfactory vibration damping properties will not be achieved. The amount of the chlorinated paraffin is preferably 20 to 200 parts by weight, more preferably 50 to 150 parts by weight, per 100 parts by weight of the chlorine-containing thermoplastic resin. When the paraffin is present in too small an amount, satisfactory vibration damping properties are not achieved, whereas presence of too large an amount entails the likelihood of bleed out.

The chlorinated paraffin component of the second resin composition for vibration damping materials is a mixture of a chlorinated paraffin having 12 to 16 carbon atoms on average with a chlorinated paraffin having 20 to 50 carbon atoms on average. As to the ratio of the former to the latter, it is desirable that the former be higher in proportion in order to realize high vibration damping properties in a higher temperature range.

The chlorinated paraffins of the third resin composition for vibration damping materials are relatively inexpensive paraffins having 20 to 50 carbon atoms on average. The chlorination degree of the chlorinated paraffin differs with the chlorine content of the chlorine-containing thermoplastic resin. With the third resin composition of the invention wherein the chlorine content of the thermoplastic resin is 30 to 50 wt. %, the first chlorinated paraffin is 30 to 50 wt. % in chlorination degree in view of compatibility and vibration damping properties. When the chlorinated paraffin which is 20 to 50 in the average number of carbon atoms with 30 to 50 wt. % in chlorination degree is singly admixed with the chlorine-containing thermoplastic resin, it is likely that the temperature at which the loss tangent, tan δ, of the vibration damping material obtained becomes maximum (the temperature will hereinafter be referred to as the "maximum tan δ temperature) will be below 0° C., so that the value of tan δ is generally small at around room temperature at which the material is widely used in actuality, failing to afford satisfactory sound insulating properties. We have found that the third resin composition which is obtained by further admixing the second chlorinated paraffin, having 20 to 50 carbon atoms on average with a chlorination degree of 50 to 70 wt. %, with this mixture is capable of realizing the maximum tan δ temperature at around room temperature without lowering the actual value of tan δ.

The chlorinated paraffin in the fourth resin composition for vibration damping materials has 12 to 50 carbon atoms on average with a chlorination degree of 30 to 70 wt. %, preferably 30 to 65 wt. %.

The proportion of the overall chlorinated paraffin component of the second to fourth resin compositions is 50 to 300 parts by weight, preferably 100 to 250 parts by weight, per 100 parts by weight of the thermoplastic resin. If the proportion of the overall paraffin component is too small, lower vibration damping performance will result, whereas if it is too great, the vibration damping material will be lower in mechanical strength and in shape retentivity.

The resin compositions of the invention for vibration damping materials may incorporate therein plasticizers, thermal stabilizers, fillers, etc. as required.

The plasticizers usable are those usually useful for vinyl chloride resins, such as dioctyl phthlate, diethyl phthlate, diisononyl phthalate and like phthalic acid plasticizers; tricresyl phosphate and like phosphoric acid ester plasticizers; tri-2-ethylhexyltrimellitate and like trimellitic acid ester plasticizers; epoxyplasticizers; polyesterplasticizers; etc. Also desirable are vegetable oil plasticizers. Phthalic acid plasticizers are desirable for inhibiting bleed out of chlorinatedparaffins. These plasticizers may be used singly, or at least two of them may be used in combination. Plasticizers other than phthalic acid plasticizers, when to be used, are used preferably in combination with phthalic acid plasticizers.

The plasticizer is used in an amount of 50 to 200 parts by weight, preferably 60 to 180 parts by weight, more preferably up to 100 parts by weight, per 100 parts by weight of the chlorine-containing thermoplastic resin. When used in an amount of this range, the plasticizer inhibits the bleed out of chlorinated paraffins and is effective for vibration damping.

With materials having a high chlorine content, chlorine-containing thermoplastic resins or chlorinated paraffins are liable to decompose, so that it is desirable to incorporate into the material thermal stabilizers for preventing the decomposition. Thermal stabilizers usable are those usually useful for polyvinyl chloride in addition to lead stabilizers. The thermal stabilizer is used preferably in an amount of 1 to 20 parts by weight per 100 parts by weight of the chlorine-containing thermoplastic resin.

Fillers may be added to the resin composition for vibration damping materials when transparency is not highly required of the product and in the case where some hardness is necessary for the composition. Examples of useful fillers are iron powder, aluminium powder, copper powder and like metal powders; mica, kaolin, montmorillonite, silica, calcium carbonate, aluminium hydroxide, magnesium hydroxide, magnesium phosphate, crystalline carbon (graphite and the like), vermiculite and like inorganic fillers. These fillers may be used singly, or at least two of them may be used in combination.

The filler should be used preferably in an amount of up to 100 parts by weight per 100 parts by weight of the chlorine-containing thermoplastic resin since presence of an excess of filler gives lower vibration damping properties to the vibration damping material.

When transparency is required of the product, rosin compounds are incorporated into the resin composition of the invention. The rosin compound to be used may be a metallic salt of rosin, rosin ester or the like. The rosin compound is used usually in an amount of 1 to 20 parts by weight per 100 parts by weight of the chlorine-containing thermoplastic resin. If the amount is less than 1 part by weight, the compound is less effective for giving improved transparency, whereas amounts in excess of 20 parts by weight are liable to permit the rosin compound to agglutinate, possibly entailing impaired transparency. When the haze indicative of optical characteristics is up to 5, the material is diminished in scattering, has an unimpaired appearance and is therefore desirable. Especially desirable for affording transparent products is the fourth resin composition.

The resin compositions of the present invention are made into vibration damping materials by forming. The vibration damping materials are not limited particularly in shape but may be in the form of sheets, plates, bars, blocks or the like. For use as sound insulating members, the material is preferably in the form of a flexible sheet as will be described later. The vibration damping material obtained is cut to required sizes for use in providing sound insulating members.

The process for producing a vibration damping material from the resin composition of the present invention is not limited specifically but can be extrusion, pressing, calendering, inflation, blowing, solvent casting or the like.

A description will be given below of the process for extruding a vibration damping material from the resin composition of the invention.

First, the resin composition of the invention is supplied to the hopper of an extruder. It is desired that the extrusion temperature of the extruder be approximately [the melting temperature of the resin composition −40° C.] to [the melting temperature +40° C.]. However, when the resin composition has a low decomposition temperature or is originally low in viscosity, the extrusion temperature may be even lower.

The extruder may be a single-screw extrduer but is preferably a twin-screw extruder to ensure an improved kneading efficiency. In the latter case, the screws may be rotated in the same direction or different directions. The screws may be full-flighted but may have a mixing section for a further improvement in kneading efficiency. The speed of rotation of the screws, the cut shape of the screw mixing section and controlled temperature are delicately adjusted to control the average domain diameter. The screw length to screw diameter ratio L/D is also optimized in accordance with the combination of ingredients.

The resin composition discharged from the extruder is fed to a die or the like which has a channel conforming to the cross sectional shape of the vibration damping material to be extruded. The die is preferably a T-die, whereas in the case where the T-die is not usable, for example, owing to an increase in pressure loss, a circular die may be used.

The vibration damping material delivered from the die is taken up by a nipping take-up while being nipped. To nip the material, the material may be passed between a plurality of rolls having a predetermined clearance, or between belts or between a belt and a roll.

It is desirable to gradually reduce the nipping temperature from an upstream position to the glass transition point or lower except where the glass transition point is around or below room temperature.

If having a small thickness, the vibration damping material is likely separate and adhere to the both surfaces of the rolls or belts, failing to form a sheet. In this case, the rolls or belts are treated as by fluorine coating and such and thereby given better release properties, or release paper or a protective film of polyethylene is superposed on at least one surface of the vibration damping material to give improved releasability.

Preferably, the resin composition is fully kneaded by a kneading machine in advance and thereafter subjected to extrusion. The kneading machine to be used is, for example, a roll kneader, kneader, or extruder.

To produce a vibration damping material by calendering, the resin composition is extruded in the form of a bar by an extruder, and the extrudate is nipped by nipping rolls while being taken up by a take-up.

A description will be given of the process for producing a vibration damping material by solvent casting.

First, the resin composition of the invention is dissolved in a solvent. The solvent is not limited particularly insofar as the composition can be dissolved therein, whereas it is desirable to use a solvent having a boiling point not higher than the melting point of the composition so that the composition as applied by coating can be dried fully. In the case where the chlorine-containing thermoplastic resin is, for example, a chlorinated polyethylene (90 to 100° C. in melting point) containing 40 wt. % of chlorine, desirable is a solvent of low boiling point, such as tetrahydrofuran (66° C. in boiling point).

The solution of the composition is then fed to a coater. The coater is preferably a die coater or comma coater.

The solution is applied to a metal or plastic substrate. The coating on the substrate is then fed to a drying oven continuously or intermittently and peeled off the substrate after drying. The layer of resin composition obtained is further dried both surfaces thereof in a drying oven to evaporate the solvent off almost completely.

Next, a description will be given of sound insulating members to be obtained with use of vibration damping material of the resin composition of the invention.

The sound insulating member of the invention comprises a vibration damping material of the invention and a rigid member joined to at least a portion of at least one surface of the damping material.

Rigid members are usable for the sound insulating member of the invention insofar as they are greater than the vibration damping material in tensile modulus. If the tensile modulus of the rigid member is too small, the vibration damping material exhibits impaired vibration absorbing performance. Preferably, the tensile modulus is therefore at least $10^8$ N/m$^2$.

Examples of materials useful for such rigid members are lead, steels (including stainless steel), iron, copper, aluminium and like metal materials; concrete, gypsum boards, marble, slates, sand, glass and like inorganic materials; bisphenol A-modified resins (polycarbonate, polysulfone, and the like), acrylic resins [polymethyl (meth)acrylate and the like], chlorine-containing resins (polyvinyl chloride, chlorinated vinyl chloride resin, etc.), acrylonitrile-butadiene-styrene copolymer resin, thermoplastic polyester resins (polyethylene terephthalate, polyethylene naphthalate, etc.), polystyrene resins, polyolefin resins (polyethylene, polypropylene, etc.), aliphatic polyamide resins (NYLON® 6, NYLON® 66, etc.), aromatic polyamide resins (KEVLAR® 29, etc.), thermoplastic polyimide resins, thermoplastic urethane resins and like thermoplastic resins; melamine resins, dicyclopentadiene resins, phenolic resins; wood materials; and others including chitin and chitosan.

These materials may be used singly, or at least two of them may be used in combination. The rigid member may be reinforced, for example, with glass fiber, carbon fiber or liquid crystal, or may be a composite plate comprising different materials. Also useful are expanded bodies of these materials.

The rigid member is not limited specifically in shape but may be in the form of a sheet, plate, bar or block. It is preferable to use a rigid member in the form of a sheet.

A description will be given of sound insulating members prepared from a vibration damping material and a rigid member each in the form of a sheet.

The rigid member is joined to at least a portion of at least one surface of the damping material. The damping material may be sandwiched between two rigid members. The two rigid members may be the same or different in thickness, material and density.

In the event of a coincidence occurring, the two rigid members are made different, for example, in thickness, material or density.

In the case where a plurality of rigid members are used, all the rigid members may be the same or different, for example, in thickness, material or density. The vibration damping member may be interposed between each pair of different rigid members, or partially between different rigid members. In the latter case, it is desirable to dispose the damping material so as to suppress the loops (portions of maximum amplitude) of waves in resonance.

A plurality of vibration damping materials may be laminated. These materials may be different or the same in thickness, material or density. A laminate of at least two types of damping materials may be sandwiched between two rigid members.

The rigid members may be transparent. Transparent rigid members are favorable to use as portions of which transparency is required, such as window glass or some sound insulating walls.

Although the method of joining the rigid member to the vibration damping material is not limited particularly, a transparent rigid member may be laminated directly to the damping material which itself is adhesive, or a double-faced tape or adhesives may be used for joining.

The sound insulating member ( . . . A-B . . . of the invention may be secured by a fixing member (C) with the vibration damping material (A) interposed therebetween to provide a sound insulating structure, for example, (C-A . . . A-B . . . A-B-A-C). The fixing member may be, for example, a metal beam, floor joist of wood or concrete foundation of a house.

Alternatively, a sound insulating structure, e.g. (B-A-B-D-B1-C or C-B1-D-B-A-B-D-B1-C), can be provided by sandwiching the vibration damping material (A) between at least two rigid members (B) to prepare a block (B-A-B), and securing a rigid member (B1) fixed by a fixing member (C) to the block by an intermediate reinforcement (D). The hyphen - means an essential bond, and the dotted line . . . means a selectable bond. The mark and the line have the same meanings in the following.

The intermediate reinforcement (D) is provided between rigid members (B, B1) to restrain the movement thereof, and the material of the reinforcement is not limited particularly like the rigid member (B) insofar as it is greater than the vibration damping material in flexural rigidity.

Examples of materials useful for the intermediate reinforcement (D) are lead, steels (including stainless steel), iron, copper, aluminium and like metal materials; concrete, gypsum boards, marble, slates, sand, glass and like inorganic materials; bisphenol A-modified resins (polycarbonate, polysulfone, and the like), acrylic resins [polymethyl (meth)acrylate and the like], chlorine-containing resins (polyvinyl chloride, chlorinated vinyl chloride resin, etc.), acrylonitrile-butadiene-styrene copolymer resin, thermoplastic polyester resins (polyethylene terephthalate, polyethylene naphthalate, etc.), polystyrene resins, polyolefin resins (polyethylene, polypropylene, etc.), aliphatic polyamide resins (NYLON® 6, NYLON® 66, etc.), aromatic polyamide resins (KEVLAR® 29, etc.), thermoplastic polyimide resins, thermoplastic urethane resins and like thermoplastic resins; melamine resins, dicyclopentadiene resins, phenolic resins; wood materials; and others including chitin and chitosan.

These materials may be used singly, or at least two of them may be used in combination. The intermediate reinforcement (D) may be reinforced, for example, with glass fiber, carbon fiber or liquid crystal, or may be a composite plate comprising different materials. Also useful are expanded bodies of these materials.

The intermediate reinforcement (D) may be joined to the rigid member (B) over entire one surface thereof or at a portion of this surface. The vibration damping material (A) may be joined to at least one of the rigid member (B) and the intermediate reinforcement (D), as interposed therebetween.

Also desirable are a sound insulating structure ( . . . B-A-B . . . - . . . D . . . - . . . B-A-B . . . ) wherein two blocks (B-A-B), each comprising two rigid members (B) joined by the vibration damping material (A), are secured by the intermediate reinforcement (D), and a sound insulating structure ( . . . B-A-B-A1-D-B-A-B . . . or . . . B-A-B-A1-D-A1-B-A-B . . . ) comprising the above structure wherein another vibration damping material (A1) is provided between the intermediate reinforcement (D) and the rigid member (B).

It is desirable to use a double-faced tape or adhesive for joining the sound insulating structure to other material. When the fourth resin composition which is especially desirable for preparing transparent products is used to provide sound insulating members, a transparent rigid member is laminated to the vibration damping material. The transparent rigid member comprises a transparent body which is preferably at least 1 GPa in longitudinal modulus so as to realize satisfactory vibration damping performance. Desirable as such a transparent rigid member is a plate of glass; polycarbonate, polysulfone or like bisphenol A-modified resin; acrylic resin which is typically a polymethacrylate; polystyrene, polyvinyl chloride, chlorinated polyvinyl chloride or like chlorine-containing resin; polyethylene terephthalate, polyethylene naphthalate or like ester resin, or a composite plate comprising such resins.

In the case where a rigid members which is slightly less transparency is acceptable, the rigid member may be a plate of polyethylene, polypropylene or like polyolefin resin; NYLON® 6, NYLON® 66 or like amide resin; urethane resin; dicyclopentadiene, norbomene or like cyclic olefin polymer resin; or other transparent resin, or a composite plate of such resins.

Preferably, the transparent rigid member is provided at least partly on both surfaces of the vibration damping material. The front and back sides of the transparent rigid member may be different in material and thickness. The thickness of the vibration damping material is up to 1/100 of the thickness of the transparent rigid member, and is preferably 100 μm to 10 mm. The vibration absorbing performance improves with an increase in the thickness of the vibration damping material, whereas in the case where the material is provided on a frame or support body, there is a tendency for the strength to be insufficient or the material cost to increase. Too small a thickness results in impaired vibration absorbing properties to entail impaired sound insulation.

The transparent rigid member may be provided over the surface thereof with an ultraviolet reflective layer or like inorganic layer by vapor deposition or coating. Further a protective silicone coating may be coated with a catalyst layer as of titanium oxide for decomposing deposits. The transparent rigid member may further be provided with a hard coating for surface protection. To provide transparent rigid members on opposite surfaces of the vibration damping material, the transparent rigid members may be affixed to the damping material by a press or using two nipping rolls. A three-layer structure comprising a vibration damping material and two transparent rigid members sandwiching the material therebetween may be extruded. The transparent rigid member may be affixed to the vibration damping material first, and the resulting assembly maybe affixed to an existing window glass plate, or a transparent resin sheet or plate.

BEST MODE OF CARRYING OUT THE INVENTION

The present invention will be described in greater detail with reference to examples.

EXAMPLES 1–4, COMPARATIVE EXAMPLES 1 AND 2

1. Preparation of Vibration Damping Materials

Predetermined amounts shown in Table 1 of a chlorine-containing thermoplastic resin [chlorinated polyethylene (product of Showa Denko K.K., trade name ELASLEN® 401," 40 wt. % in chlorine content), polyvinyl chloride (product of Sekisui Chemical Co., Ltd., commodity No. "SLP40," 57 wt. % in chlorine content), or chlorinated vinyl chloride resin (product of Sekisui Chemical Co., Ltd., commodity No. "HA05K," 70 wt. % in chlorine content)] and dioctyl phthalate were kneaded in a kneader (product of Moriyama Co., Ltd., Model "G50-15"). A chlorinated paraffin [(product of Asahi Denka Kogyo K.K., commodity No. "A-430," 14 in the average number of carbon atoms, 43 wt. % in chlorination degree), (product of Tosoh Corp., trade name "TOYOPARAX® 270," 12 in the average number of carbon atoms, 70 wt. % in chlorination degree), (product of Tosoh Corp., trade name "TOYOPARAX® 265," 12 in the average number of carbon atoms, 65 wt. % in chlorination degree), (product of Tosoh Corp, trade name, "TOYOPARAX® 40," 25 in the average number of carbon atoms, 40 wt. % in chlorination degree), or (product of Ajinomoto Fine-Techno, Co., Ltd., trade name "EMPARA® 70," 26 in the average number of carbon atoms, 70 wt. % in chlorination degree)] was thereafter fed to the kneader, followed by kneading at a predetermined temperature to obtain a resin composition for vibration damping materials.

The resin composition obtained was fed to a single-screw extruder (product of GM Engineering Co., Ltd., Model "GM50") equipped with a T-die at the discharge outlet and was extruded at a predetermined barrel and die temperature to obtain a vibration damping material in the form of a 1-mm-thick sheet.

2. Evaluation of Vibration Damping Materials

The sheets of vibration damping materials obtained in Examples 1 to 4 and Comparative Examples 1 and 2 were checked for storage modulus (E') and loss modulus (E") at a frequency of 100 Hz using a viscoelasticity measuring instrument (product of Toyo Seiki Seisakusho Co., Ltd., trade name "RHEOGRAPH") to calculate the values of tan δ(=E"/E'). Table 1 collectively shows the temperature at which the tan δ of each damping material became maximum and the maximum value of tan δ.

TABLE 1

|  |  | Example | | | | Comp. Ex. | |
|---|---|---|---|---|---|---|---|
|  |  | 1 | 2 | 3 | 4 | 1 | 2 |
| Resin composition (wt. parts) | | | | | | | |
| Cl-containing thermoplastic resin | Chlorinated polyethylene (Cl content 40 wt. %) | 100 | 100 | — | — | 100 | — |
|  | Polyvinyl chloride (Cl content 57 wt. %) | — | — | 100 | — | — | — |
|  | Chlorinated vinyl chloride resin (Cl content 70 wt. %) | — | — | — | 100 | — | 100 |
| Chlorinated paraffin | Average number of C atoms | 14 | 12 | 12 | 12 | 25 | 26 |
|  | Chlorination degree (wt. %) | 43 | 70 | 65 | 70 | 40 | 70 |
|  | Amount | 100 | 100 | 125 | 150 | 100 | 150 |
| Dioctyl phthalate |  | — | — | 25 | 50 | — | 50 |
| Kneader temp. (° C.) |  | 100 | 100 | 120 | 130 | 100 | 130 |
| Extruder barrel, die temp. (° C.) |  | 120 | 120 | 130 | 140 | 120 | 140 |
| Evaluation | tan δ max. value | 2.2 | 1.8 | 1.7 | 1.7 | 1.5 | 0.8 |
|  | Temp. (° C.) | −5 | 40 | 30 | 40 | −10 | 40 |

EXAMPLE 5

1. Preparation of Sound Insulating Members

Used as rigid members were two gypsum boards (product of Yoshino Sekko Co., ltd., trade name "TIGER BOARD," 0.75 g/cm³ in density, 12.5 mm in thickness, 2.4 m in long side length, 90 cm in short side width). Three sets of sound insulating members were prepared each by sandwiching the vibration damping material obtained in Example 1 between the two gypsum boards and laminating the layers over the entire surfaces.

2. Evaluation of Sound Insulating Members

The sound insulating members prepared were placed in an acoustic measuring chamber and checked for sound transmission loss according to JISA1416. The three sound insulating members are arranged side by side in intimate contact with one another, with the clearances between the members filled up with an oil-containing clay.

A noise generator (product of Rion Co., Ltd., Model "SF-05") was used so as to produce noise over the range of all frequencies, with the sound pressure level of the sound source set at about 90 dB. All-pass pink noise was used. An octave-band precision noise meter (product of Rion Co., Ltd., Model "NA-29") was used to measure sound pressure levels. After measuring the sound pressure level of the sound source, the sound pressure level resulting from transmission through the sound insulating members was measured to calculate the difference between the sound pressure levels.

As compared with the sound insulation effect provided by the mass law, the improvement effect achieved is usually higher in a high frequency range than in a low frequency range, so that the sound pressure levels were compared at 125 Hz for the evaluation in the low frequency range to find a reduction of 18.0 dB (hence high sound insulation performance).

COMPARATIVE EXAMPLE 3

Three sets of sound insulating members were prepared in the same manner as in Example 5 except that no vibration damping material was sandwiched between the two gypsum boards (thus preparing laminates each comprising two gypsum boards; the same will be prepared below).

The sound pressure levels on the sound source side and through the sound insulating members were compared at 125 Hz in the same manner as in Example 5 to find a reduction of 15.0 dB.

Example 5 involves a sound insulation effect attributable to the vibration damping material. When calculated according to the mass law [Equation (1)]:

$$18\log(m \cdot f) - 47 \ldots \quad (1)$$

wherein m is the surface density (kg/m²), and f is the frequency (Hz), the effect is 0.5 dB. The improvement in sound insulation achieved in Example 5 by the difference of construction was 2.5 dB.

EXAMPLE 6

Three sets of sound insulating members were prepared in the same manner as in Example 5 except that one of the gypsum board was given a thickness of 9.5 mm.

The sound pressure levels on the sound source side and through the sound insulating members were compared at 125 Hz in the same manner as in Example 5 to find a reduction of 17.0 dB. When the coincidence was measured at a frequency of 1 kHz [calculated from Equation (2)] at which the coincidence was maximum, the coincidence was −1 dB.

$$fc = (c_0^2/2\pi t) \times [12\rho(1-\upsilon)^2/E] \ldots \quad (2)$$

wherein
$c_0$: the velocity of sound in air (m/s)
t: the thickness of the board (m)
$\rho$: the density of the board (kg/m³)
$\upsilon$: Poisson's ratio
E: the modulus of elasticity of the board (N/m³)

COMPARATIVE EXAMPLE 4

Three sets of sound insulating members were prepared in the same manner as in Example 6 except that no vibration damping material was sandwiched between the gypsum boards.

The sound pressure levels on the sound source side and through the sound insulating members were compared at 125 Hz in the same manner as in Example 5 to find a reduction of 14.0 dB. The coincidence at 1 kHz was −3 dB. Accordingly, the improvement in sound insulation attributable to the difference in construction involved in Example 6 was 2.5 dB, and the improvement in coincidence was 2 dB.

EXAMPLE 7

Three sets of sound insulating members were prepared in the same manner as in Example 5 except that one of the gypsum board was 1.3 (g/cm³) in density.

The sound pressure levels on the sound source side and through the sound insulating members were compared at 125 Hz in the same manner as in Example 5 to find a reduction of 19.6 dB. The coincidence at 500 Hz was −1 dB.

COMPARATIVE EXAMPLE 5

Three sets of sound insulating members were prepared in the same manner as in Example 7 except that no vibration damping material was sandwiched between the gypsum boards.

The sound pressure levels on the sound source side and through the sound insulating members were compared at 125 Hz in the same manner as in Example 5 to find a reduction of 16.6 dB. The coincidence at 500 Hz was −2 dB. Accordingly, the improvement in sound insulation attributable to the difference in construction involved in Example 7 was 2.5 dB, and the improvement in coincidence was 2 dB.

EXAMPLE 8

Three sets of sound insulating members were prepared in the same manner as in Example 5 except that the two gypsum boards were replaced by two glass plates (3 mm in thickness).

The sound pressure levels on the sound source side and through the sound insulating members were compared at 125 Hz in the same manner as in Example 5 to find a reduction of 17.5 dB. The coincidence at 2 kHz was −0.5 dB.

COMPARATIVE EXAMPLE 6

Three sets of sound insulating members were prepared in the same manner as in Example 8 except that no vibration damping material was sandwiched between the glass plates.

The sound pressure levels on the sound source side and through the sound insulating members were compared at 125 Hz in the same manner as in Example 5 to find a reduction of 14.5 dB. The coincidence at 2 kHz was −4.0 dB. Accordingly, the improvement in sound insulation attributable to the difference in construction involved in Example 8 was 3.0 dB, and the improvement in coincidence was 3.5 dB.

EXAMPLE 9

Three sets of sound insulating members were prepared in the same manner as in Example 5 with the exception of affixing a double-faced tape (product of Sekisui Chemical Co., Ltd., W3 Type) to the entire surface on both sides of the vibration damping material and thereafter sandwiching the damping material between the gypsum boards for lamination over the entire surfaces.

The sound pressure levels on the sound source side and through the sound insulating members were compared at 125 Hz in the same manner as in Example 5 to find a reduction of 18.8 dB. The improvement in sound insulation due to the increase of mass of the double-faced tape based on Equation (1) was 0.3 dB. The substantial improvement in sound insulation over Example 5 was 0.5 dB.

EXAMPLE 10

The three sets of sound insulating members prepared in Example 5 were fixed to the fixed wall (fixed member) of the acoustic measuring chamber, with the 1-mm-thick vibration damping material of Example 1 interposed therebetween. The clearance between the fixed wall and the sound insulating members was similarly filled up with an oil-containing clay to prepare a sound insulating structure.

The sound pressure levels on the sound source side and through this structure were compared at 125 Hz to find a reduction of 18.5 dB. The substantial improvement in sound insulation over Example 5 was 0.5 dB.

EXAMPLE 11

A single gypsum board, the same as the one used in Example 5, was attached to one surface of the sound insulating member prepared in Example 5, with an intermediate reinforcement (wood bars of square cross section, measuring 5 cm×5 cm) provided therebetween. As the intermediate reinforcement, bars were attached to the sound insulating member, as positioned along the length thereof at its opposing sides, and five widthwise bars were attached to the member, as arranged along the length thereof at an interval of 60 cm. The widthwise reinforcement bars were attached at their ends to the lengthwise reinforcement bars, with the intervening clearance eliminated to the greatest possible extent. The sound insulating member and the gypsum board were fixed to the reinforcement with wood screws to fabricate a sound insulating structure.

The sound pressure levels on the sound source side and through this structure were compared at 125 Hz in the same manner as in Example 5 to find a reduction of 22.0 dB.

EXAMPLE 12

A sound insulating structure was prepared in the same manner as in Example 11 except that in the structure of Example 11, the vibration damping material of Example 1 was held between the sound insulating member and the intermediate reinforcement so as to extend over the width of the reinforcement.

The sound pressure levels on the sound source side and through this structure were compared at 125 Hz in the same manner as in Example 5 to find a reduction of 22.5 dB.

The improvement over Example 11 in sound insulation due to the increase of mass of the damping material was 0.1 dB, so that the substantial improvement in sound insulation of the structure of Example 12 was +0.4 dB.

COMPARATIVE EXAMPLE 7

A structure corresponding to the structure of Example 11 from which the vibration damping material and the intermediate reinforcement were removed (i.e., three gypsum board) was fixed with wood screws to obtain a sound insulating structure.

The sound pressure levels on the sound source side and through this structure were compared at 125 Hz in the same manner as in Example 5 to find a reduction of 18.3 dB.

With respect to Example 11, the improvement in sound insulation due to the increase of mass of the damping material and the intermediate reinforcement was 0.7 dB, so that the substantial improvement in sound insulation of the structure of Example 11 was +3.0 dB. In the case of Example 12, the improvement in sound insulation due to the increase of mass of the damping material and the intermediate reinforcement was 0.8 dB, so that the substantial improvement in sound insulation of the structure was 3.4 dB.

EXAMPLE 13

Two sets of sound insulating members, the same as those prepared in Example 5, were prepared and fixedly joined together to provide a sound insulating structure, using the same intermediate reinforcement as used in Example 11.

The sound pressure levels on the sound source side and through this structure were compared at 125 Hz in the same manner as in Example 5 to find a reduction of 24.0 dB.

COMPARATIVE EXAMPLE 8

A structure corresponding to the structure of Example 13 from which the vibration damping material and the intermediate reinforcement were removed (i.e., three gypsum board) was fixed with wood screws to obtain a sound insulating structure.

The sound pressure levels on the sound source side and through this structure were compared at 125 Hz in the same manner as in Example 5 to find a reduction of 20.5 dB.

Since the improvement in sound insulation due to increased mass, that is, due to the increase of mass of the damping material and intermediate reinforcement in Example 13 from the mass in Comparative Example 8 was 0.7 dB, the substantial improvement in sound insulation of the structure of Example 13 was +2.8 dB.

EXAMPLE 14

A sound insulating structure was prepared in the same manner as in Example 13 except that the vibration damping material of Example 1 was held between the sound insulating member on the sound incident side and the intermediate reinforcement in the structure of Example 13 so as to extend over the width of the reinforcement.

The sound pressure levels on the sound source side and through the structure obtained were compared at 125 Hz in the same manner as in Example 5 to find a reduction of 24.5 dB.

Since the improvement in sound insulation due to increased mass, that is, due to the increase of mass of the damping material and intermediate reinforcement as compared with the structure of Comparative Example 8 was 0.8 dB, the substantial improvement in sound insulation was +3.2 dB.

The structure of Example 14 achieved an improvement of +0.4 dB over Example 13 in sound insulation.

EXAMPLE 15

A sound insulating structure was prepared in the same manner as in Example 13 except that the same double-faced tape as used in Example 9 was affixed to the entire surface of the gypsum board, between the sound insulating member on the sound incident side and the gypsum board in the structure of Example 13.

The sound pressure levels on the sound source side and through the structure obtained were compared at 125 Hz in the same manner as in Example 5 to find a reduction of 24.6 dB.

Since the improvement in sound insulation due to increased mass, that is, due to the increase of mass of the damping material, intermediate reinforcement and the double-faced tape as compared with the structure of Comparative Example 8 was 0.9 dB, the substantial improvement in sound insulation was +3.2 dB.

The structure of Example 15 achieved an improvement of +0.4 dB over Example 13 in sound insulation.

EXAMPLE 16

A chlorinated polyethylene (product of Showa Denko K.K., "ELASLEN® 402NA," 40 wt. % in chlorine content) in an amount of 100 parts by weight, 150 parts by weight of a chlorinated paraffin having 10 to 16 carbon atoms on average (product of Asahi DenkaKogyo K.K., "E500," 50 wt. % in chlorination degree, 14 in average carbon atom number) and 50 parts by weight of a chlorinated paraffin having 20 to 50 carbon atoms on average (product of Asahi Denka Kogyo K.K., "A430," 43 wt. % in chlorination degree, 25 in average carbon atom number) were kneaded in a roll kneader. The resin composition obtained was pressed at 120° C. into a sheet of vibration damping material having a thickness of 1 mm.

EXAMPLE 17

A chlorinated polyethylene (product of Showa Denko K.K., "ELASLEN® 402NA," 40 wt. % in chlorine content) in an amount of 100 parts by weight, 150 parts by weight of a chlorinated paraffin having 10 to 16 carbon atoms on average (product of Tosoh Corp., "TOYOPARAX® 265," 65 wt. % in chlorination degree, 12 in average carbon atom number) and 50 parts by weight of a chlorinated paraffin having 20 to 50 carbon atoms on average (product of Asahi Denka Kogyo K.K., "A-430," 43 wt. % in chlorination degree, 25 in average carbon atom number) were kneaded in a roll kneader. The same procedure as in Example 16 was thereafter repeated to prepare a sheet of vibration damping material.

COMPARATIVE EXAMPLE 9

A sheet of vibration damping material was prepared in the same manner as in Example 16 with the exception of using as a chlorinated paraffin 200 parts by weight of only the chlorinated paraffin having 20 to 50 carbon atoms on average (product of Asahi Denka Kogyo K.K., "A430," 43 wt. % in chlorination degree, 25 in average carbon atom number) without using the chlorinated paraffin having 10 to 16 carbon atoms on average.

COMPARATIVE EXAMPLE 10

A sheet of vibration damping material was prepared in the same manner as in Example 16 with the exception of using as a chlorinated paraffin 200 parts by weight of only the chlorinated paraffin having 10 to 16 carbon atoms on average (product of Asahi Denka Kogyo K.K., "E500," 50 wt. % in chlorination degree, 14 in average carbon atom number) without using the chlorinated paraffin having 20 to 50 carbon atoms on average.

COMPARATIVE EXAMPLE 11

A sheet of vibration damping material was prepared in the same manner as in Example 16 with the exception of using a resin containing no chlorine, i.e., ethylene-vinyl acetate copolymer (product of Mitsui Polychemical Co., Ltd., "P-1905," 0 wt. % in chlorine content) in place of the chlorinated paraffins.

Evaluation of Vibration Damping Materials

The performance of the vibration damping materials prepared in Examples 16, 17 and Comparative Examples 9 to 11 was evaluated by the following method. Table 2 collectively shows the results.

The sheets of vibration damping material immediately after preparation and one year after preparation were checked for loss tangent using a viscoelasticity measuring instrument (product of Toyo Seiki Seisakusho Co., Ltd., "RHEOLOGRAPH®") at a temperature range of −60 to 60° C. and a frequency of 100 Hz. The loss tangent, tan δ (=E"/E'), was calculated from the longitudinal modulus (E', E") in the usual manner. The maximum values of loss tangent obtained are shown in Table 2.

TABLE 2

|  |  | Example | | Comp. Ex. | | |
| --- | --- | --- | --- | --- | --- | --- |
|  |  | 16 | 17 | 9 | 10 | 11 |
| Resin composition (wt. parts) | | | | | | |
| Chlorinated polyethylene | | 100 | 100 | 100 | 100 | — |
| Ethylene-vinyl acetate copolymer | | — | — | — | — | 100 |
| Chlorinated paraffin | | | | | | |
| (av. number of C atoms = 14, chlorination amount = 50) | | 150 | — | — | 200 | 150 |
| Chlorinated paraffin | | | | | | |
| (av. number of C atoms = 25, chlorination amount = 43) | | 50 | 50 | 200 | — | 50 |
| Chlorinated paraffin | | — | 150 | — | — | — |
| (av. number of C atoms = 12, chlorination amount = 65) | | | | | | |
| Evaluation | | | | | | |
| tan δ max. | Immediately after preparation | 3.4 | 3.2 | 2.8 | 3.5 | 1.0 |
|  | 1 year after preparation | 3.2 | 3.1 | 2.6 | 2.7 | 0.5 |

EXAMPLE 18

With 100 parts by weight of a chlorine-containing thermoplastic resin, i.e., chlorinated polyethylene containing 40 wt. % of chlorine (product of Showa Denko, K.K., "ELASLEN® 401")were admixed 150 parts by weight of a chlorinated paraffin having a chlorination degree of 43 wt. % (product of Asahi Denka Kogyo K.K., "A-430," 25 in the average number of carbon atoms) and 100 parts by weight of a chlorinated paraffin having a chlorination degree of 70 wt. % (product of Ajinomoto Fine-Techno, Co., Ltd., "EMPARA 70," 26 in the average number of carbon atoms), and the mixture was kneaded in a kneader (product of Moriyama Co., Ltd., "Model G50-15") at a temperature of about 110° C. The resin composition obtained was pressed at 120° C. into a sheet of vibration damping material having a thickness of 1 mm.

EXAMPLE 19

With a 100 parts by weight of a chlorine-containing thermoplastic resin, i.e., chlorinated polyethylene containing 40 wt. % pf chlorine (product of Showa Denko K.K., "ELASLEN® 401") were admixed 150 parts by weight of a chlorinated paraffin having a chlorination degree of 43 wt. % (producs of Asahsi Denka Kogyo K.K., "A-430," 25 in the average number of carbon atoms), 100 parts by weight of a chlorinated paraffin having a chlorination degree of 70 wt. % (product of Ajinmoto Fine-Techno Co., Ltd., "EMPARA® 70," 26 in the average number of carbon atoms), and 5 parts by weight of a rosin ester (product of Arakawa Chemical Co., Ltd., "KE656"). The mixture was thereafter kneaded and made into a sheet in the same manner as in Example 18 to obtain a sheet of vibration damping material having a thickness of 1 mm.

COMPARATIVE EXAMPLE 12

With 100 parts by weight of a chlorine-containing thermoplastic resin, i.e., chlorinated polyethylene containing 40 wt. % of chlorine (product of Showa Denko, K.K., "ELASLEN® 401") were admixed 200 parts by weight of a chlorinated paraffin having a chlorination degree of 43 wt. % (product of Asahi Denka Kogyo K.K., "A-430," 25 in the average number of carbon atoms). The mixture was thereafter kneaded and made into a sheet in the same manner as in Example 18 to obtain a sheet of vibration damping material having a thickness of 1 mm.

COMPARATIVE EXAMPLE 13

With 100 parts by weight of a chlorine-containing thermoplastic resin, i.e., chlorinated polyethylene containing 40 wt. % of chlorine (product of Showa Denko, K.K., "ELASLEN® 401") was admixed 150 parts by weight of a chlorinated paraffin having a chlorination degree of 70 wt. % (product of Ajinomoto Fine-Techno, Co., Ltd.," "EMPARA® 70," 26 in the average number of carbon atoms). The mixture was thereafter kneaded and made into a sheet in the same manner as in Example 18 to obtain a sheet of vibration damping material having a thickness of 1 mm.

COMPARATIVE EXAMPLE 14

With 100 parts by weight of a chlorine-containing thermoplastic resin, i.e., polyvinyl chloride containing 57 wt. % of chlorine (product of Sekisui Chemical Co., Ltd., "TS 1000R") was admixed 100 parts by weight of a chlorinated paraffin having a chlorination degree of 70 wt. % (product of Ajinomoto Fine-Techno, Co., Ltd., "EMPARA® 70," 26 in the average number of carbons). The mixture was thereafter kneaded and made into a sheet in the same manner as in Example 18 to obtain a sheet of vibration damping material having a thickness of 1 mm.

Evaluation of Vibration Damping Materials a) The sheets of resin compositions for vibration damping materials obtained in Examples 18 to 19 and Comparative Examples 12 to 14 were checked for characteristics. The longitudinal modulus (E', E") was measured by a viscoelasticity measuring instrument (product of Toyo Seiki Seisakusho Co., Ltd., "Rheolograph") to calculate the loss tangent, tan δ (=E"/E'). The maximum tan δ temperature was determined. The measurement was conducted at a frequency of 100 Hz and in a temperature range of –40 to 60° C.

b) Each sheet was touched by hand three days after preparation and checked for bleed out (present=x, absent=O).

c) The sheets of vibration damping materials obtained in Examples 18 to 19 and Comparative Examples 12 to 14 were cut to a size, 5 cm×5 cm. Each cut sheet of vibration damping material was sandwiched between two glass plates (5 cm×5 cm×3 mm), and the sandwich assembly obtained was placed into a vacuum bag. The assembly was thereafter pressed in 10 mm Hg vacuum at a temperature of 140° C. for 30 minutes to prepare the samples. The sample was checked for haze by a haze meter (product of Tokyo Denshoku Co., Ltd., "TC-H3P"), whereby the total luminous transmittance and haze were determined.

Table 3 collectively shows the results.

TABLE 3

| | Example | | | Comp. Ex. | | | |
|---|---|---|---|---|---|---|---|
| | 18 | 19 | 20 | 12 | 13 | 14 | 15 |
| Resin composition (wt. parts) | | | | | | | |
| Chlorinated polyethylene (Chlorination degree 40 wt. %) | 100 | 100 | 100 | 100 | 100 | | |
| Polyvinyl chloride (Chlorination degree 57 wt. %) | | | | | | 100 | 100 |
| Chlorinated paraffin (av. number of C atoms = 25, chlorination degree = 43) | 150 | 150 | | 200 | | | |
| Chlorinated paraffin (av. number of C atoms = 26, chlorination degree = 70) | 100 | 100 | 100 | | 150 | 100 | 100 |
| Dioctyl phthalate | | | 50 | | | | 50 |
| Tin-based thermal stabilizer | | | 0.5 | | | | |
| Rosin ester | | 5 | | | | | |

TABLE 3-continued

|  | Example | | | Comp. Ex. | | | |
| --- | --- | --- | --- | --- | --- | --- | --- |
|  | 18 | 19 | 20 | 12 | 13 | 14 | 15 |
| Evaluation | | | | | | | |
| tan δ of composition sheet | 2.5 | 2.0 | 2.7 | 2.0 | 1.2 | 1.9 | 1.4 |
| Max. tan δ temp. (° C.) | 20 | 22 | 21 | -8 | 13 | 22 | 35 |
| Bleed out | No | No | No | No | Yes | No | No |
| Total ray transmittance (%) | 85 | 85 | 89 | 85 | 80 | 83 | 85 |
| Haze (%) | 6.7 | 7.2 | 1.9 | 7.2 | 11.2 | 9.4 | 8.0 |

Table 3 reveals that the sheets of resin compositions of Examples 18 to 19 exhibited satisfactory results with respect to all the items. On the other hand, the sheet of Comparative Example 12 was low in the value of tan δ at room temperature, while the sheet of Comparative Example 13 was low in the value of tan δ and involved bleed out. The sheet of Comparative Example 14 was low in the value of tan δ, with the maximum temperature failing to match the room temperature.

EXAMPLE 20

A chlorinated polyethylene (product of Showa Denko K.K., "ELASLEN® 401," 40 wt. % in chlorine content) in an amount of 100 parts by weight, 200 parts by weight of a chlorinated paraffin (product of Asahi Denka Kogyo K.K., "A-430," 43 wt. % in chlorine content, 25 in the average number of carbon atoms) and 5 parts by weight of a rosin ester (product of Arakawa Chemical Co., Ltd., "KE656") were kneaded in a roll kneader at a temperature of 90° C. The resin composition obtained was then pressed into a sheet by a press at a temperature of 120° C. Thus, a sheet of vibration damping material was obtained which had a thickness of 1 mm.

The sheet of vibration damping material was subsequently sandwiched between two glass plates (90 cm in width, 180 cm in length and 3 mm in thickness), and the sandwich assembly obtained was placed into a vacuum bag. The assembly was thereafter pressed in a vacuum at a temperature of 140° C. and a pressure of 10 mm Hg for 30 minutes to prepare a sound insulating member in the form of a plate. Further the same procedure as above was performed under the same conditions except that the glass plates were replaced by those measuring 5 cm in width, 5 cm in length and 3 mm in thickness to prepare a platelike sound insulating member.

EXAMPLE 21

A chlorinated polyethylene (product of Showa Denko K.K., "ELASLEN® 402NA," 40 wt. % in chlorine content) in an amount of 100 parts by weight, 150 parts by weight of a chlorinated paraffin (product of Tosoh Corp., "TOYO-PARAX® 265," 65 wt. % in chlorination degree, 12 in the average number of carbon atoms), 50 parts by weight of a chlorinated paraffin (product of Asahi Denka Kogyo K.K., "A430," 43 wt. % in chlorination degree, 25 in the average number of carbon atoms) and 5 parts by weight of a rosin ester (product of Arakawa Chemical Co., Ltd., "KE656") were kneaded in a roll kneader at a temperature of 90° C. The same procedure as in Example 20 was thereafter repeated to prepare a platelike sound insulating member.

EXAMPLE 22

A chlorinated polyethylene (product of Showa Denko K.K., "ELASLEN® 402NA," 40 wt. % in chlorine content) in an amount of 100 parts by weight, 150 parts by weight of a chlorinated paraffin (product of Tosch Co., Ltd., "E500," 50 wt. % in chlorination degree, 14 in the average number of carbon atoms), 50 parts by weight of a chlorinated paraffin (product of Asahi Denka Kogyo K.K., "A430," 43 wt. % in chlorination degree, 25 in the average number of carbon atoms) and 5 parts by weight of a metallic salt of rosin (product of Arakawa Chemical Co., Ltd., "KM-1300") were kneaded in a roll kneader at a temperature of 90° C. The same procedure as in Example 21 was thereafter repeated to prepare a platelike sound insulating member.

EXAMPLE 23

A chlorinated polyethylene (product of Showa Denko K.K., "ELASLEN® 402NA," 40 wt. % in chlorine content) in an amount of 100 parts by weight, 150 parts by weight of a chlorinated paraffin (product of Asahi Denka Kogyo Co., Ltd., "E500," 50 wt. % in chlorination degree, 14 in the average number of carbon atoms), 50 parts by weight of a chlorinated paraffin (product of Asahi Denka Kogyo K.K., "A430," 43 wt. % in chlorination degree, 25 in the average number of carbon atoms) and 5 parts by weight of a rosin ester (product of Arakawa Chemical Co., Ltd., "KE656") were kneaded in a roll kneader at a temperature of 90° C. The resin composition obtained was then pressed into a sheet by a press at a temperature of 120° C. Thus, a sheet of vibration damping material was obtained which had a thickness of 1 mm.

The procedure of Example 20 was then performed under the same conditions except that polycarbonate plates (90 cm in width, 180 cm in height and 3 mm in thickness) were used in place of the glass plates to prepare a platelike sound insulating member.

COMPARATIVE EXAMPLE 15

A platelike sound insulating member was prepared by performing the same procedure as in Example 20 except that no rosin ester was used.

COMPARATIVE EXAMPLE 16

A platelike sound insulating member was prepared by performing the same procedure as in Example 20 with the exception of using 150 parts by weight of a paraffin-based process oil (product of IdemitsuKosan Co., Ltd., "PW-90," 0 wt. % in chlorine content) in place of the chlorinated paraffin.

COMPARATIVE EXAMPLE 17

A platelike sound insulating member was prepared by performing the same procedure as in Example 20 with the exception of using 100 parts by weight of an ethylene-vinyl acetate copolymer (product of Mitsui Polychemical Co., Ltd., "P-1905") in place of the chlorinated polyethylene.

COMPARATIVE EXAMPLE 18

A platelike sound insulating member was prepared by performing the same procedure as in Example 20 except that the amount of the chlorinated paraffin (product of Asahi Denka Kogyo K.K., "A430," 43 wt. % in chlorine content, 25 in the average number of carbon atoms) was changed to 20 parts by weight.

COMPARATIVE EXAMPLE 19

A platelike sound insulating member was prepared by repeating the same procedure as in Example 23 except that the rosin ester was not used.

transmission through the sample was measured to calculate the difference between the sound pressure levels as an index to evaluation. The sound pressure level difference was evaluated on all-pass basis (all frequencies). Table 4 shows the measurements. Sound insulation performance of 35 dB and above was evaluated as being satisfactory.

b) Transparency

The samples of transparent sound insulating members (5 cm×5 cm) obtained in Examples 20 to 23 and Comparative Examples 15 to 19 were checked for total luminous transmittance and haze according to JIS K6718 using a haze meter (product of Tokyo Denshoku Co., Ltd., "TC-H3DP"). A haze value of up to 5 was evaluated as being satisfactory.

Further the sheets of vibration damping materials were checked for tan δ representing the vibration damping properties, at a frequency of 100 Hz and a temperature range of −40 to 60° C. using a viscoelasticity measuring instrument (product of Toyo Seiki Seisakusho Co., Ltd., "RHEOLOGRAPH"). Table 4 shows the measurements.

TABLE 4

|  | Example | | | | Comp. Ex. | | | | |
| --- | --- | --- | --- | --- | --- | --- | --- | --- | --- |
|  | 21 | 22 | 23 | 24 | 16 | 17 | 18 | 19 | 20 |
| Resin composition (wt. parts) | | | | | | | | | |
| Chlorinated polyethylene | 100 | 100 | 100 | 100 | 100 | 100 |  | 100 | 100 |
| Ethylene-vinyl acetate copolymer |  |  |  |  |  |  | 100 |  |  |
| Chlorinated paraffin (av. number of C atoms = 14, Cl content = 50) |  |  | 150 | 150 |  |  |  |  | 150 |
| Chlorinated paraffin (av. number of C atoms = 25, Cl content = 43) | 200 | 50 | 50 | 50 | 200 |  | 200 | 20 | 50 |
| Chlorinated paraffin (av. number of C atoms = 12, Cl content = 65) |  | 150 |  |  |  |  |  |  |  |
| Rosin ester | 5 | 5 |  | 5 |  | 5 | 5 | 5 |  |
| Rosin metal salt |  |  | 5 |  |  |  |  |  |  |
| Paraffin oil |  |  |  |  |  | 150 |  |  |  |
| Rigid member | | | | | | | | | |
| Glass plate | ○ | ○ | ○ |  | ○ | ○ | ○ | ○ |  |
| Polycarbonate plate |  |  |  | ○ |  |  |  |  | ○ |
| Evaluation | | | | | | | | | |
| Sound insulation (dB) | 37 | 38 | 38 | 36 | 36 | 31 | 30 | 30 | 35 |
| Total ray transmittance (%) | 89 | 89 | 87 | 87 | 85 | 82 | 81 | 87 | 83 |
| Haze (%) | 1.8 | 1.8 | 1.9 | 3.4 | 7.2 | 14.3 | 13.5 | 2.5 | 10.7 |
| tan δ of damping material | 3.0 | 3.2 | 3.4 | 3.4 | 2.8 | 1.2 | 1.0 | 1.0 | 3.2 |

Performance Test a) Sound Insulating Properties

The samples of transparent sound insulating members (90 cm×180 cm) obtained in Examples 20 to 23 and Comparative Examples 15 to 19 were placed in an acoustic measuring chamber and checked according to JIS A1416:1974. A noise generator (product of Rion Co., Ltd., Model "SF-05") was used with the sound source set at 110 dB (background noise 45 dB). All-pass pink noise was used. An octave-band precision noise meter (product of Rion Co., Ltd., Model "NA-29") was used to measure the sound pressure level of the sound source. After measuring the sound pressure level of the sound source, the sound pressure level resulting from Table 4 reveals that the transparent sound insulating members of Examples all achieved satisfactory results with respect to any item.

INDUSTRIAL APPLICABILITY

The present invention provides compositions for vibration damping members and vibration damping materials prepared from the composition by forming. The invention also provides sound insulating members comprising the vibration damping material for reducing the vibration and noise produced in various structures such as office buildings, houses, condominiums and like residential buildings, expressways, elevated bridges and railroads, transport means such as motor vehicles, rolling stock, ships and aircraft (including helicopters), household electric appliances, office automation devices, industrial machines, mobile products, etc.

Stated more specifically, the invention provides sound insulating members which are adapted to greatly attenuate the vibrations and noise produced from various articles, devices, structures or equipment, such as partitions, outer walls, ceilings, floors, beams and like structural members, water supply pipes, drain pipes, jigs for installing such pipes, pipe spaces, pipe shafts, doors, roofs, movable partitioning members including Japanese sliding doors and sliding paper doors, partitioning walls or members, staircases, fastening screws, soundproof chambers, ducts, skylights, windows including see-through windows in doors or in the interior, window seals in houses, condominiums, office buildings, factories or plants; sound insulating walls of expressways, rails, sleepers, ballast and ballast mats of railroads; slab mats, concrete panels, bridge girders, rails and sound insulating walls of elevated bridges; roof panels, dashboards, floor panels, trunk space partitioning panels, tire houses, panels around seats on chassis, engine supports, bonnet hoods and other components around engines, axles, axle supports, suspensions and other parts around axles, windows and window glass seals in motor vehicles; floors, ceilings, side panels, doors, wheels, axles, chassis, coupling devices, pantographs, windows, window seals and sheet fixing frames of railroad cars; decks, wall panels of living quarters, engine rooms and windows in ships including fast boats and leisure boats; floors, ceilings, side panels, doors, engine rooms, propellers, windows and window seals in aircraft including helicopters; cases or cabinets and sliding members of office automation devices including printers, fans, motors, MO, CD, FD, HD and like drives, video cameras, cameras, copying machines, facsimile devices, CD and DVD decks, video, cassette, DAT and like decks, digital cameras and personal computers; industrial machines including elevators, escalators, compressors, generators, mowers, tractors, bulldozers, shovel-type excavators, dump trucks, wheel loaders, road rollers, truck mixer agitators, power shovels, pile drivers, cranes, resin extruders, injection molding machines, presses, kneaders, mixing rolls, pumps, rock drills, crushers, backhoes, tackers, pneumatic nailers, automatic vending machines, automatic checking and collecting machines and belt conveyors; household electric appliances including washing machines, dryers, sewing machines, dishwashers, vacuum cleaners, air conditioners, fan heaters, refrigerators, rotary beaters, warm-water toiler seats, bathroom dryers, refuse disposal machines, juicers, electric fans, cooling hair dryers, shavers, fluorescent lamps with inverter and telephone receivers; and mobile products including mobile or cellular phones, headphone-type stereos, headphone-type MD stereos, headphone-type CD stereos and lap top personal computers.

What is claimed is:

1. A sound insulating member comprising a vibration damping material prepared from a resin composition and a rigid member joined to at least a portion of at least one surface of the damping material, said vibration damping material being secured to a fixing member,
wherein said vibration damping material (a) is interposed between said rigid member and said fixing member and (b) is in the shape of a sheet, plate, bar, or block, and
wherein the resin composition contains 100 parts by weight of a chlorine-containing thermoplastic resin, and 20 to 200 parts by weight of a chlorinated paraffin having 12 to 16 carbon atoms on average.

2. The sound insulating member according to claim 1, wherein the chlorine-containing thermoplastic resin contains 30 to 70 wt. % of chlorine, and the chlorinated paraffin is 30 to 70 wt. % in chlorination degree.

3. A method of reducing sound vibration comprising incorporating the sound insulating member according to claim 1, into an article, device, structure or equipment.

4. A sound insulating member comprising a vibration damping material prepared from a resin composition and a rigid member joined to at least a portion of at least one surface of the damping material, said vibration damping material being secured to a fixing member,
wherein said vibration damping material is interposed between said rigid member and said fixing member, and
wherein the resin composition contains 100 parts by weight of a chlorine-containing thermoplastic resin having a chlorine content of 20 to 70 wt. %, and 50 to 300 parts by weight of a mixture of a chlorinated paraffin having 12 to 16 carbon atoms on average with 30 to 70 wt. % in chlorination degree and a chlorinated paraffin having 20 to 50 carbon atoms on average with 30 to 70 wt. % in chlorination degree, the proportion by wt. % of the former chlorinated paraffin being larger than the proportion by wt. % of the latter chlorinated paraffin.

5. A sound insulating member comprising a vibration damping material prepared from a resin composition and a rigid member joined to at least a portion of at least one surface of the damping material, said vibration damping material being secured to a fixing member,
wherein said vibration damping material is interposed between said rigid member and said fixing member, and
wherein the resin composition consists essentially of 100 parts by weight of a chlorine-containing thermoplastic resin having a chlorine content of 30 to 50 wt. %, and 50 to 300 parts by weight of a mixture of a chlorinated paraffin having 20 to 50 carbon atoms on average with 30 to 50 wt. % in chlorination degree and a chlorinated paraffin having 20 to 50 carbon atoms on average with 50 to 70 wt. % in chlorination degree.

6. A sound insulating member comprising a transparent vibration damping material prepared from a resin composition and a rigid member joined to at least a portion of at least one surface of the damping material,
wherein the resin composition contains 100 parts by weight of a chlorine-containing thermoplastic resin having a chlorine content of 20 to 70 wt. %, 50 to 300 parts by weight of a chlorinated paraffin having 12 to 50 carbon atoms on average with 30 to 70 wt. % in chlorination degree, and 1 to 20 parts by weight of a rosin compound.

7. A sound insulating member comprising a vibration damping material prepared from a resin composition and a rigid member joined to at least a portion of at least one surface of the damping material,
wherein the resin composition contains 100 parts by weight of a chlorine-containing thermoplastic resin, 20 to 200 parts by weight of a chlorinated paraffin having 12 to 16 carbon atoms on average, and 1 to 20 parts by weight of a rosin compound per 100 parts by weight of the chlorine-containing thermoplastic resin.

8. The sound insulating member according to any one of claims 1 to 5, wherein the resin composition further contains 50 to 200 parts by weight of a plasticizer per 100 parts by weight of the chlorine-containing thermoplastic resin.

9. The sound insulating member according to any one of claims 1 to 5, wherein the resin composition further contains 1 to 20 parts by weight of a rosin compound per 100 parts by weight of the chlorine-containing thermoplastic resin.

10. The sound insulating member according to any one of claims 1 to 5, 6 and 7, wherein the rigid member has a tensile modulus of at least $10^8$ N/m$^2$.

11. The sound insulating member according to any one of claims 1 to 5 and 6, wherein the chlorine-containing thermoplastic resin is a chlorinated polyethylene.

12. The sound insulating member according to any one of claims 1, 4 and 5, wherein said vibration damping material is directly secured to a fixing member.

* * * * *